US006406294B1

(12) United States Patent
Bell

(10) Patent No.: US 6,406,294 B1
(45) Date of Patent: Jun. 18, 2002

(54) SELF CONTAINED DENTAL CHAIR WITH INTEGRATED COMPRESSOR AND VACUUM PUMP AND METHODS

(75) Inventor: Daniel D. Bell, Littleton, CO (US)

(73) Assignee: Bell Dental Products, LLC, Denver, CO (US)

(*) Notice: Subject to any disclaimer, the term of this patent is extended or adjusted under 35 U.S.C. 154(b) by 0 days.

(21) Appl. No.: 09/718,299

(22) Filed: Nov. 21, 2000

Related U.S. Application Data

(60) Provisional application No. 60/167,336, filed on Nov. 24, 1999.

(51) Int. Cl.[7] .......................... A61C 15/00; A61C 17/00

(52) U.S. Cl. ........................................... 433/33; 433/80

(58) Field of Search ............................ 433/80, 77, 92, 433/78, 33; 312/209

(56) References Cited

U.S. PATENT DOCUMENTS

| | | | | | |
|---|---|---|---|---|---|
| 3,143,803 | A | * | 8/1964 | Lunn | 433/77 |
| 3,198,574 | A | * | 8/1965 | Ota et al. | 433/78 |
| 3,553,840 | A | * | 1/1971 | Bordelon | 433/77 |
| 3,586,374 | A | | 6/1971 | Laessker | 297/115 |
| 3,591,234 | A | | 7/1971 | Condon | 297/346 |
| 3,729,227 | A | | 4/1973 | Ohta | 297/391 |
| 3,731,383 | A | | 5/1973 | Hayashi | |
| 3,746,033 | A | * | 7/1973 | Keiper, II | 433/92 |
| 3,757,420 | A | | 9/1973 | Silverman | |
| 3,771,226 | A | * | 11/1973 | Lieb et al. | 433/77 |
| 3,823,979 | A | | 7/1974 | Davis | 297/330 |
| 3,826,531 | A | | 7/1974 | Page | 297/188 |
| 3,934,929 | A | | 1/1976 | Rabinowitz | 297/75 |
| 3,934,931 | A | | 1/1976 | Matsui et al. | 297/319 |
| 3,964,725 | A | | 6/1976 | Matsui et al. | 248/421 |
| 4,083,600 | A | | 4/1978 | Hirth | 297/316 |
| D250,921 | S | | 1/1979 | Ruby | D6/58 |
| 4,160,323 | A | * | 7/1979 | Tracy | 433/77 |
| 4,173,372 | A | | 11/1979 | Norris | 297/345 |
| D255,622 | S | | 7/1980 | Ota | D6/22 |
| 4,215,476 | A | * | 8/1980 | Armstrong | 433/80 |
| D260,703 | S | | 9/1981 | Pearson | D6/22 |
| 4,367,894 | A | | 1/1983 | Manuel | 247/19 |
| D268,149 | S | | 3/1983 | Case | D6/22 |
| 4,413,858 | A | | 11/1983 | Beach | 297/188 |
| 4,415,203 | A | | 11/1983 | Cawley | 297/391 |
| 4,454,426 | A | | 6/1984 | Benson | |
| 4,456,297 | A | | 6/1984 | Pietschmann et al. | 297/316 |
| 4,505,514 | A | | 3/1985 | Stockl et al. | 297/322 |
| 4,527,976 | A | | 7/1985 | Behringer et al. | 433/33 |
| 4,572,573 | A | | 2/1986 | Yoshikawa et al. | 297/75 |
| 4,630,862 | A | | 12/1986 | Watanabe | 297/167 |
| D294,891 | S | | 3/1988 | Gyaami | D6/361 |
| 4,778,216 | A | | 10/1988 | Stupakis | 297/17 |
| D333,736 | S | | 3/1993 | Nordstrom | D6/367 |
| 5,190,349 | A | | 3/1993 | Austin, Jr. et al. | 297/316 |
| D336,381 | S | | 6/1993 | Nordstrom | D6/367 |
| D347,946 | S | | 6/1994 | Nordstrom et al. | D6/367 |
| 5,484,188 | A | | 1/1996 | Stoeckl | 297/408 |
| 5,601,331 | A | | 2/1997 | Austin, Jr. et al. | 297/170 |
| 5,678,894 | A | | 10/1997 | Eley | 297/354.13 |

* cited by examiner

*Primary Examiner*—Cary E. O'Connor
(74) *Attorney, Agent, or Firm*—Townsend and Townsend and Crew LLP

(57) ABSTRACT

The invention provides an exemplary modular dental chair system and methods for its use. In one embodiment, a compressor, vacuum pump, water reservoir, waste container and associated fittings, wiring, and plumbing are integrated into a dental chair. The compressor, vacuum pump, water reservoir, and waste container provide the services needed to perform dental procedures. Such a configuration allows the chair to be located and relocated without having to connect to facility centralized air, water, and waste.

16 Claims, 9 Drawing Sheets

SELF CONTAINED DENTAL CHAIR WITH INTEGRATED COMPRESSOR AND VACUUM PUMP AND METHODS

CROSS-REFERENCES TO RELATED APPLICATIONS

This application is a continuation in part application and claims the benefit of U.S. Provisional Application No. 60/167,336, filed Nov. 24, 1999, the complete disclosure of which is herein incorporated by reference.

BACKGROUND OF THE INVENTION

This invention is related generally to the field of dentistry, and more specifically to the field of dental equipment. In a specific aspect, the invention relates to a self-contained dental chair with an integrated compressor and vacuum pump and methods for its use.

Dentists need compressed air, vacuum, and water available at the dental chair when performing dental procedures. Presently the dental chair is connected to office utilities for these commodities. These office utilities represent a compressor and vacuum pump in a separate equipment room and associated plumbing and controls to distribute the compressed air and vacuum to the dental chairs in the office. In addition, a sewer connection is needed to dispose of waste fluids and solids picked up by the vacuum system.

Each dental chair in the office is connected to the office utilities by plumbing with connections either in the floor or an umbilical from the wall or ceiling. These connections make it difficult or impossible to move the dental chair once it is installed and connected to the plumbing.

The separate equipment room uses up valuable office space, the compressor and vacuum equipment are expensive, the plumbing is expensive, and the entire system requires maintenance. Hence, the invention is related to improved dental chairs which have a variety of versatile features.

SUMMARY OF THE INVENTION

In one embodiment, a dental chair comprises a chair body having a base, a seat and a back. Integrated into the chair body is a compressor and vacuum pump. For example, the compressor and vacuum pump may be incorporated into the base of the chair. The chair further includes a positive pressure line that is coupled to the compressor to supply positive pressure to one or more dental tools. Conveniently, the chair may include a pressure regulator to control the pressure in the positive pressure line. The chair further includes a vacuum line that is coupled to the vacuum pump to supply a vacuum to one or more dental tools. In this way, the dental chair may be used to operate various dental tools without requiring extensive backroom equipment and connection lines typically used in dental offices.

In one aspect, the chair further includes a controller and sensors that are incorporated into the chair body to operate the compressor and the vacuum pump. The chair may further include a power supply to supply power to the controller, the compressor and the vacuum pump.

In another aspect, the chair also includes a waste container that is coupled to the vacuum line to collect liquid and solid waste from the vacuum line. For example, the waste container may comprise a lid that is coupled to the vacuum line and a base that is removably coupled to the lid to permit the base to be removed, sealed and discarded.

In another aspect, the chair includes a water container that is coupled to the positive pressure line to permit water from the container to be supplied to one or more dental tools upon introduction of positive pressure into the water container. In one specific aspect, the water container comprises a housing, a sealed bag of water disposed within the housing, and a needle assembly coupled to the housing. The needle assembly has a hollow needle to penetrate the sealed bag. In this way, introduction of positive pressure into the housing causes the bag to compress and forces the water out of the needle.

As an alternative to integrating the compressor and the vacuum pump into the chair, they may be included in an auxiliary unit having connections to permit the auxiliary unit to be coupled to the positive pressure line, vacuum line, and the water line of the chair. In this way, an existing dental chair may easily be converted to a "self contained" dental chair. Conveniently, the auxiliary unit may also include a power supply and a controller to control operation of the compressor and vacuum pump.

In another embodiment, the invention provides a liquid supply system for delivering liquid from a sealed bag. The system comprises a housing and a sealed bag of liquid disposed within the housing. A needle assembly is coupled to the housing and has a hollow needle to penetrate the sealed bag. A pressure source is also provided to supply positive pressure into the housing to compress the bag and force the liquid out of the needle.

DESCRIPTION OF THE SPECIFIC EMBODIMENTS

Figure 1:
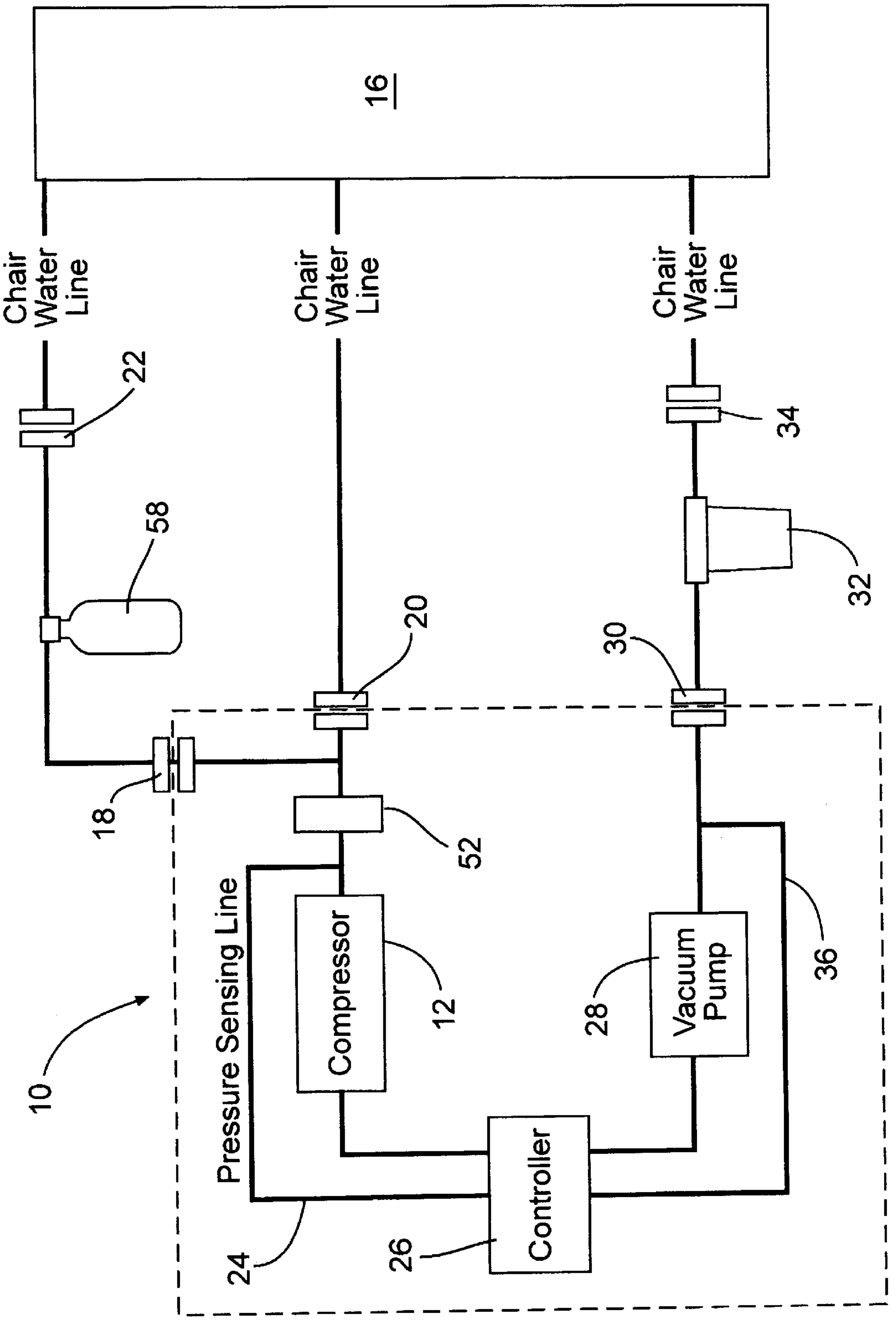
FIG. 1 is a block diagram of the system, showing the different components and their interconnection.

In one embodiment, the invention integrates a small high performance compressor and a vacuum pump into a dental chair or an auxiliary housing to eliminate the need for the equipment room, plumbing, maintenance, and expense typically associated with same. The compressor and vacuum pump are small enough to integrate into the base of the dental chair or may be assembled into a small auxiliary housing that can be placed by the dental chair.

Over the course of time a dental practice will often grow and shrink as it is influenced by different factors and market forces, including but not limited to demographics, public policy, economics, and personal circumstances. As the practice expands and contracts the dentist is forced to make related decisions. For example, if the practice is expanding, the dentist must make decisions about whether to enlarge the existing office, or move to a new office. This can be a very costly activity because present dental chairs must have the central facility utilities available to provide electricity, compressed air, vacuum, and water to each chair. The chairs cannot be easily moved because these utility connections must be maintained and are generally permanently installed in the office structure. The invention integrates the utilities to the chair by either mounting them into the chair itself, or mounting them into an auxiliary unit that is placed by the chair and connected to the chair. Integrating the utilities into the chair eliminates the need to interface with the fixed office utility connections, allowing the chair to easily be moved virtually anywhere.

The self-contained dental chair may be used to reduce the facilities cost, space demands, and complexity of installing a dental chair in a dental office, and to improve the flexibility and ease of adding, deleting, or relocating a dental chair, or chairs, within a dental office. In one embodiment, the unit is composed of a dental chair to which a small compressor, vacuum pump, and controller is installed along with associated connecting fittings, tubing and electrical wiring, water and waste container, and sensors and controls.

Having the compressor and vacuum pump integrated into the dental chair eliminates the need for a separate remote central compressor, vacuum pump, and air, vacuum and water lines, as well as the associated plumbing and associated maintenance that is required with present dental chairs.

The compressor, vacuum pump, and controller are mounted in an appropriate place in or on the dental chair, within the base, for example. A bracket may be installed on the dental chair to hold the water reservoir and waste container, providing an independent water supply and waste container for the dental chair. Associated fittings, connectors, and plumbing are installed to connect the compressor, vacuum pump, and controller to electrical power and each other, to connect the compressor and vacuum pump to the water and waste containers, and to connect the compressor, vacuum pump, and water and waste containers to the associated dental equipment, including, but not limited to, a dental hand piece, High Volume Evacuator (HVE), saliva ejector, scalar, air water syringe and the like.

Conveniently, the compressor and vacuum pump may be constructed using the linear motor technology described in U.S. Pat. No. 4,454,426, the complete disclosure of which is herein incorporated by reference. The compressor and vacuum pump unit of the invention may be integrated into any dental chair, including, but not limited to, those described in U.S. Pat. Nos. 4,173,372, 4,083,600, 3,964,725, 3,934,931, 3,934,929, 3,826,531, 3,823,979, 3,731,383, 3,729,227, 3,586,374, D0347946, D0336381, D0333736, D0294891, D0268149, D0260703, D0255622, D0250921, D05190349, 5,678,894, 5,601331, 4,778,216, 4,630,862, 4,572,573, 4,456,297, 4,415,203, 4,413,858, 4,367,894, 3,826,531, 4,505,514, 3,757,420, 5,484,188, 4,413,858, 3,591,234, and 4,527,976, the complete disclosures of which are herein incorporated by reference.

In addition, the compressor, vacuum pump, and controller can be assembled into an auxiliary unit, which, with the proper connection fittings and plumbing can be connected to any dental chair to provide compressed air, vacuum and water. For example, the unit may be placed into an existing junction box of a conventional dental chair. This allows any dental chair to be "converted" to a self-contained chair, eliminating the need for the connections to facility equipment. This is useful in the event the dentist wants to convert all chairs to a "self-contained" design or if the dentist has a problem with the office compressed air or vacuum supplies.

The impact of this device is significant. For example, no longer does a dentist have to allocate a large amount of office space and capital to the compressor and vacuum pump equipment. No longer does the dentist have to pay the high cost to have air and vacuum lines installed throughout the dental office. No longer does the dentist have to pay the associated maintenance for the compressor, vacuum pump, and associated plumbing. Essentially, all that is needed for a dentist to set-up an office is an electrical connection and a source of water to fill the water reservoir. The self-contained dental chair is moved into the office, plugged into the electrical outlet, the water reservoir is filled, and the dentist is ready to operate. In the event the dentist wants to add a dental chair, all that is required is to move the new chair in and plug it into an electrical outlet. In the event the dentist wants to delete a chair, all that is required is to unplug the chair from the electrical outlet and move it out. In the event the dentist wants to relocate a dental chair, all that is required is to unplug the chair and move it to the desired location.

The unit of the invention may be used with essentially any dental hand piece system, including but not limited to, air or electric driven.

In one aspect, the unit may be operated as follows. The compressor provides compressed air to the dental chair. An accumulator can be incorporated into the unit to store compressed air, if necessary. The compressed air is connected by associated fittings and plumbing to the water reservoir and the delivery system connections to provide compressed air to the dental hand piece, air/water syringe, and other items requiring compressed air. The water reservoir is connected by associated fittings and plumbing to the delivery system connection to provide water to the dental hand piece, air water syringe, scalar, and other items requiring water. The compressed air and water supply subsystems connect to the existing dental chair delivery system so no change is necessary in the existing design or fabrication of these items.

The water reservoir may be an autoclavable container that will be capable of accepting any water, tap, sterilized, buffered, etc. An optional piece of equipment will allow the dentist to use standard sterile water bags.

The compressor output will be sufficient to operate an air driven hand piece in addition to the auxiliary devices mentioned above. For example, the output may be used to supply an air/water syringe, etc.

A pressure regulator is incorporated into the unit to control the supply pressure to the dental chair. A pressure sensor monitors the air pressure to the dental chair. A pressure switch turns the compressor ON and OFF to maintain a constant supply pressure.

The waste container is connected to the vacuum pump and has connections for the HVE and saliva ejector devices. The controller activates the vacuum pump on demand. The controller can activate the vacuum pump using one of several possible methods, including but not limited to, sensing the line pressure in the vacuum lines, responding to an electrical switch connected to the HVE and saliva ejector control valves, or responding to operation of a foot switch.

The installation of the compressor and vacuum pump will be such that they will be easy to remove and replace in the event of a problem. Easy access will allow the disconnection of the associated tube(s) and electrical connector(s). In one specific aspect, four mounting bolts may be removed to remove the unit. A clamp type hold down is also possible to facilitate removal and installation.

This type chair has a broad range of benefits. For new graduate dentists, it will allow the dentist to set-up an office literally anywhere at minimum start-up cost. It will also maximize the usability of any space selected. No equipment room will be necessary. No plumbing will be necessary. For the practicing dentist, an auxiliary unit will convert any chair to a self contained chair by connecting the existing chair's air, water and vacuum connections to the utility box and adding the necessary mounting brackets for the water and waste containers. This will allow the dentist to easily move to a different office, redecorate the office, or add or remove chairs with minimal cost and impact to the office.

Hence, in an exemplary embodiment, the invention provides for the packaging of a small compressor, vacuum pump, control electronics, and associated items, plumbing, fittings, and wiring into the base of a dental chair, or into an auxiliary unit that is placed by a dental chair. The compressor and vacuum pump and associated items provide all of the utilities needed by the dentist in the performance of various dental procedures. This includes: compressed air for the hand pieces, air/water syringe, scalar, or other dental tool, and water system water for the hand pieces, air/water syringe, scalar, or other dental tool, and vacuum for the HVE, and saliva ejector, or other dental tools. The water is provided by a self-contained water system comprising a water reservoir and associated interconnect tubing and fittings. Compressed air from the compressor pressurizes the water bottle forcing water out of the bottle and to the various dental tools. It should be noted that with this design concept there is no impact to any or the operation or connections of the dental tools. The integrated compressor and vacuum pump interface with existing chair and delivery system connections.

The controller monitors the operational situation and sensor inputs and commands the compressor and vacuum pump ON and OFF as required. A pressure sensor monitors the compressed air pressure. When the pressure drops below a certain preset level the controller turns the compressor ON. When a preset upper limit is reached the controller turns the compressor OFF. A small accumulator can be inserted into the compressed air system if necessary to meet surge demands or reduce pressure variations to the dental tools. The controller does the same for the vacuum pump based on monitoring a vacuum sensor.

Two possible concepts for holding the water are available. The first is to use a water bottle. A water bottle screws into a manifold fitting that is connected to the compressed air supply and water plumbing of the chair. The source of the water is transparent to the dentist because the bottle supplies water to the existing chair water system. There is no impact to the operation of the water system. The second concept incorporates a water container that houses a standard sterile water bag. The container incorporates a quick disconnect fitting hollow needle assembly that interfaces with a sterile water bag interface on the inside of the container and the water supply system for the chair on the outside of the container. There is also a quick disconnect type fitting that interfaces with the compressed air supply on the outside and is open to the inside of the container. The container, when closed, is sealed. When set-up the compressor will pressurize the inside of the container and force the sterile water out through the hollow needle into the water supply tubing of the chair. With this concept essentially any type of sterile mixture can be dispensed to the patient. The sterile water bag interface is constructed of a quick disconnect, a short piece of tubing, and a common sterile needle for piercing the bag of water. The bag of water is pierced with the needle, placed in the container, the container is closed and sealed and the water system is ready for use. The water bag container can be mounted to the chair or accessory supports in a manner similar to the water bottle system.

The waste container collects waste fluids and solids from the dental procedure. A modification is required to existing chairs to install the waste container. Presently the waste tubes from the dental chair feed directly to the waste lines from the central facility. This line may be cut and attached to the waste container. The waste container can be mounted with the water bottle or separately. Again, with this type installation there is no impact to the operation of any of the vacuum tools.

If the compressor and vacuum pump are mounted in an auxiliary housing, the auxiliary unit may be placed next to the chair and the connections made as described above. If the compressor and vacuum pump are integrated into a new dental chair all connections will be designed into the chair.

In summary, the invention provides an exemplary self-contained dental chair constructed of a dental chair and integrated compressor, vacuum pump, controller, accumulator (if needed) and associated connecting fittings, tubing and electrical wiring, water and waste containers, and sensors and controls.

Figure 4B:
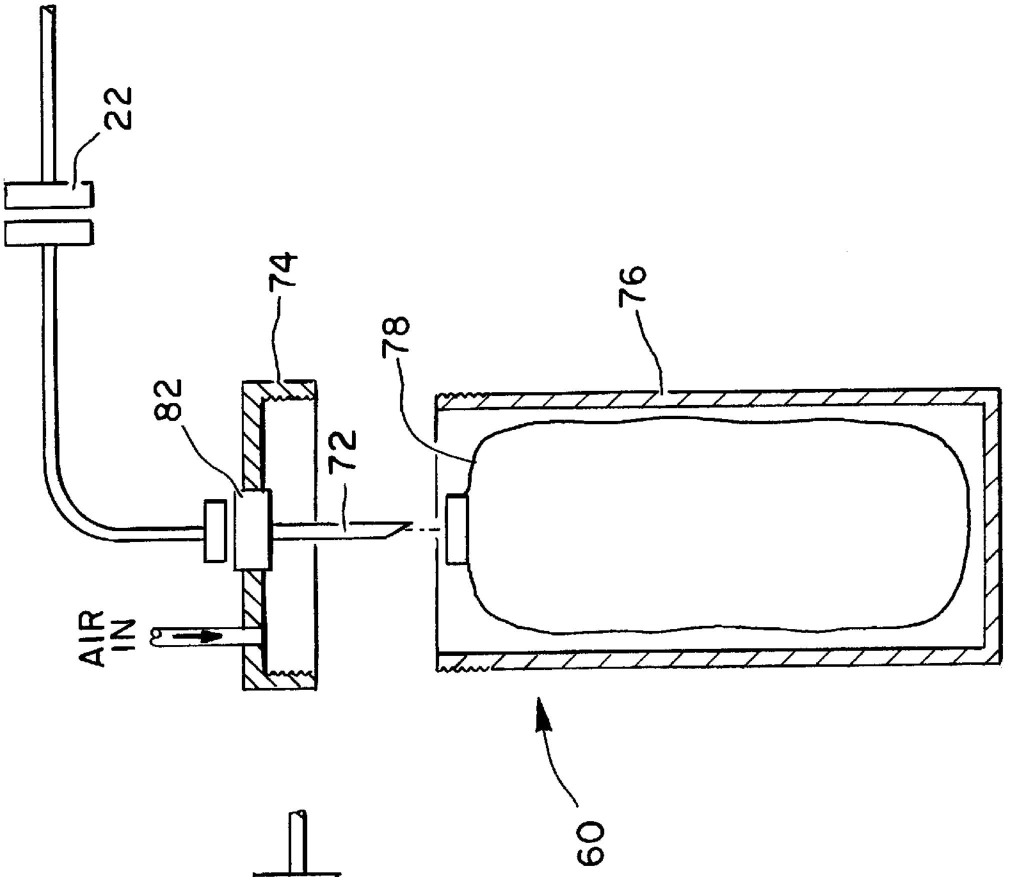
FIG. 4B is a schematic diagram of the water system of the system of FIG. 1 showing another possible concept to dispense water to the chair delivery system.

Referring to FIG. 1, an exemplary self-contained dental chair 10 will be described. Central to system 10 is a compressor 12, a vacuum pump 28, and a controller 26. These components may be integrated into the base of the chair or packaged in an auxiliary unit as shown in phantom line. Compressor 12 provides compressed air to a water reservoir 58 (or a water reservoir 60 as shown in FIG. 4B) through accumulator 52 and quick disconnect fitting 18 and to a delivery system 16 through a quick disconnect fitting 20. The compressed air delivered to water reservoir 58 forces water out of the water reservoir to delivery system 16 through quick disconnect 22. A pressure sensing line 24 connects the output of compressor 12 to controller 26. Vacuum pump 28 provides vacuum suction to a waste container 32 through a quick disconnect 30. Waste container 32 is connected to delivery system 16 through a quick disconnect 34. A vacuum sensing line 36 connects the input of vacuum pump 28 to controller 26. Controller 26 monitors the operating conditions of system 10 and controls the operation of compressor 12 and vacuum pump 28. Delivery system 16 may include one or more of the following dental tools: an air/water syringe, a scaler, handpiece, and the like.

Figure 2:
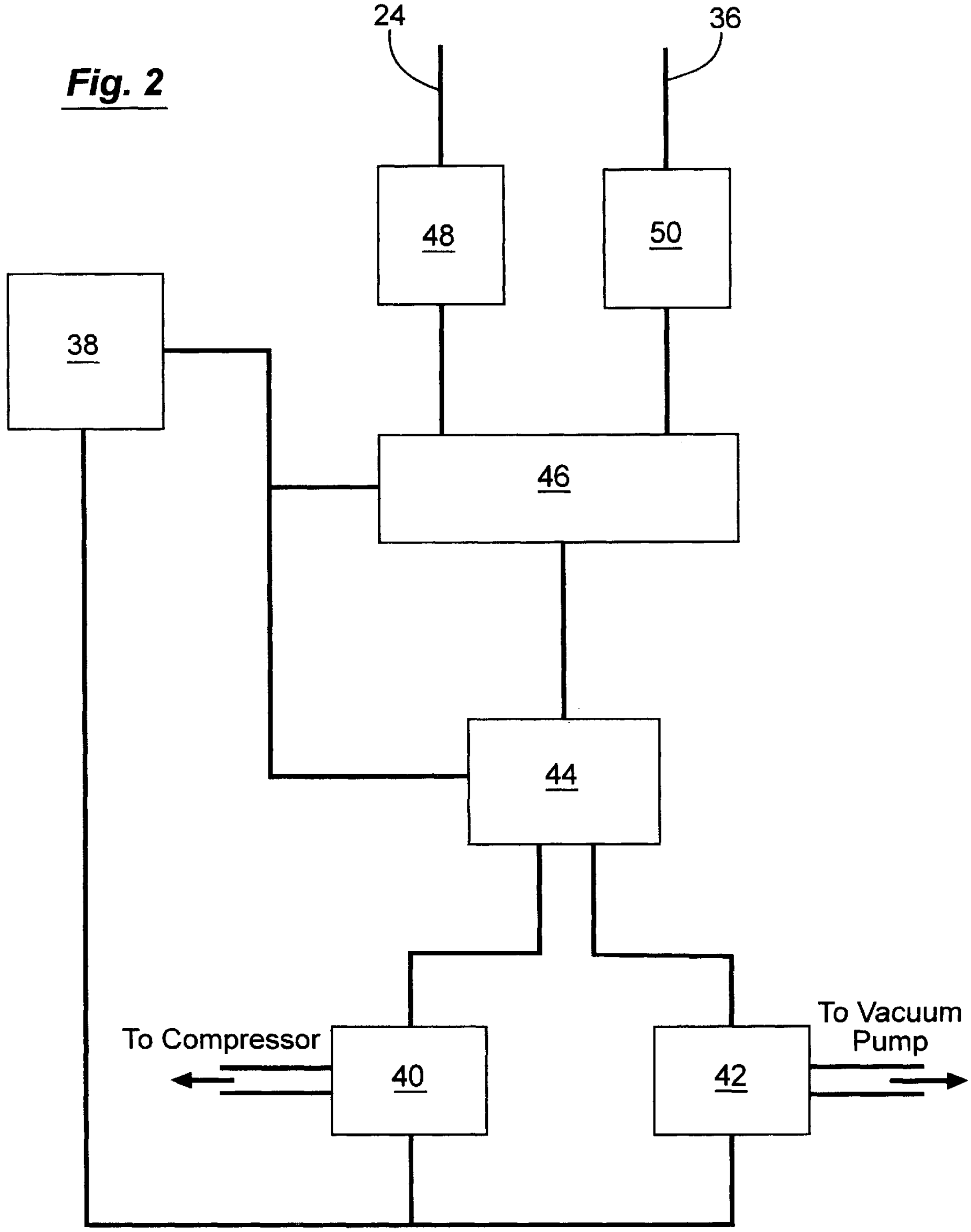
FIG. 2 is a schematic diagram of the controller of the system of FIG. 1.

Referring to FIG. 2 construction of controller 26 will be described in more detail. Controller 26 includes a power supply 38 that converts standard AC input power to 24 VAC distributed power bus for the other elements in controller 26. More specifically, a compressor relay 40 is used to turn compressor 12 on and off based on the pressure in the air supply line 24, a vacuum pump relay 42 is used to turn vacuum pump 28 on and off and a micro controller 44 is used to control the operation of system 10. A data interface 46 is also provided. Pressure in air supply line 24 is sensed by a pressure sensor 48 and a signal sent to data interface 46. When the air supply pressure drops below a preset value data interface 46 sends a signal to micro controller 44 to turn compressor 12 on. Micro controller 44 sends a signal to compressor relay 40 to close and turn compressor 12 on. When the air supply line pressure reaches a preset value data interface 46 sends a signal to micro controller 44 to turn compressor 12 off. Similarly, vacuum sensor 50 senses vacuum line vacuum and sends a signal to data interface 46. When the vacuum descreases to a preset value data interface 46 sends a signal to micro controller 44 to turn vacuum pump 28 on. Micro controller 44 sends a signal to vacuum pump relay 42 to close and turn vacuum pump 28 on.

Figure 3:
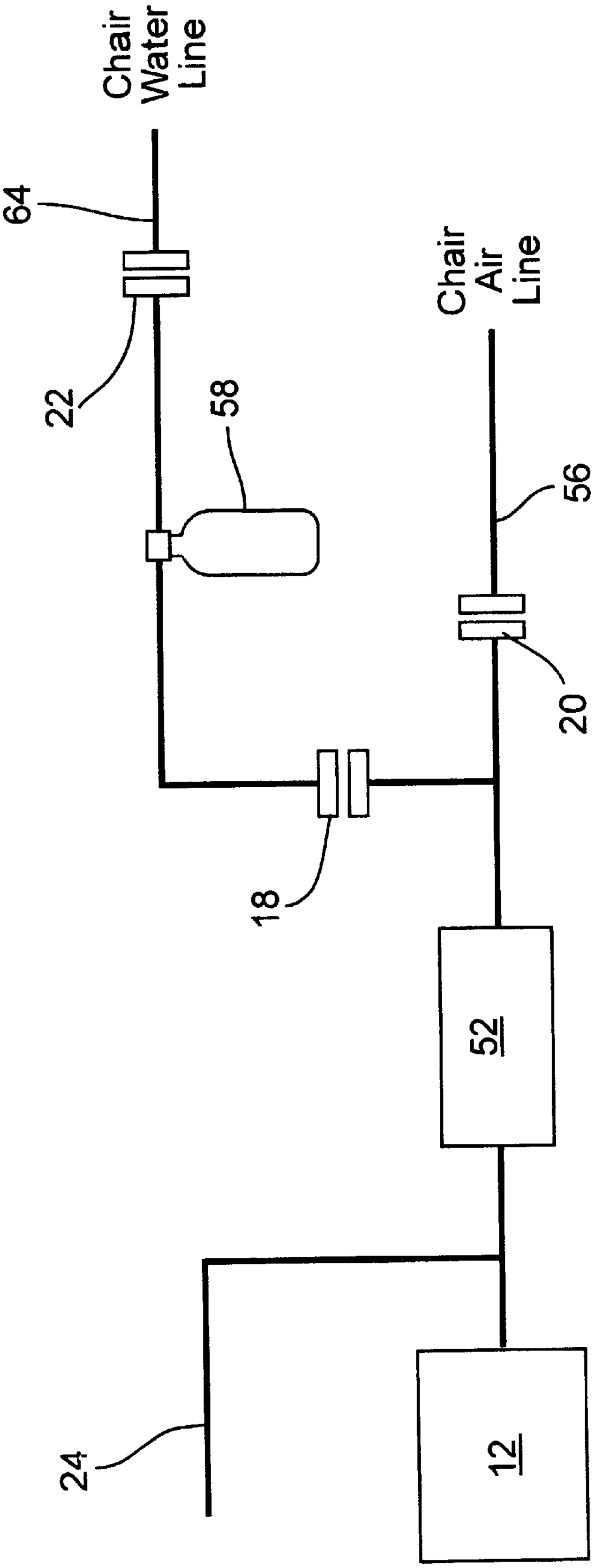
FIG. 3 is a schematic diagram of the pneumatic system of the system of FIG. 1.

Referring to FIGS. 1 and 3, the pneumatics will be described in greater detail. Compressor 12 provides compressed air that is stored in the accumulator 52. Accumulator 52 is connected to quick disconnects 18 and 20 allowing for the easy replacement of accumulator 52. Quick disconnect 20 is connected to the existing air supply line 56 of the chair 14. Water reservoir 58 (or 60) is connected to quick disconnect 22 which is connect to the existing water line 64 from the chair. Compressed air from accumulator 52 flows directly to existing chair air line 56 and water reservoir 58. Water is forced from water reservoir 58 and flows to quick disconnect 22 and existing chair water line 64.

Figure 4A:
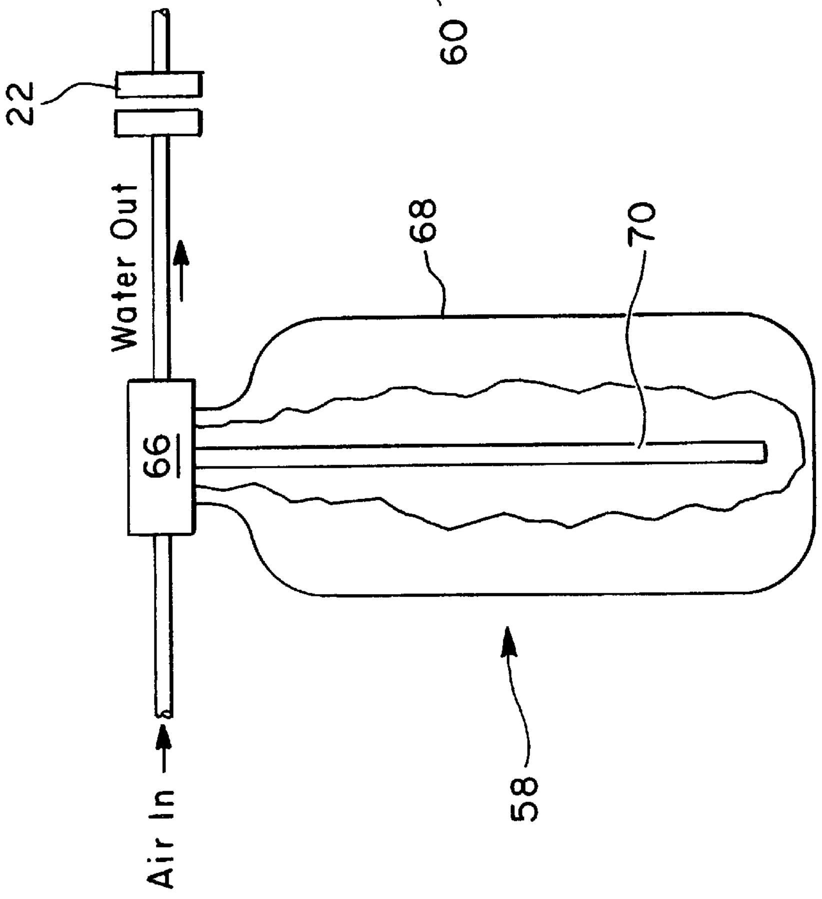
FIG. 4A is a schematic diagram of the water system of the system of FIG. 1 showing one possible concept to dispense water to the chair delivery system.

Referring to FIG. 4A water reservoir 58 will be described in more detail. Water reservoir 58 is composed of top 66, bottle 68, and pick-up tube assembly 70. Pressurized air from compressor 12 enters bottle 68 through top 66 and pressurizes bottle 68. Water is forced into pick-up tube 70 and out of top 66 to quick disconnect 22. Shown in FIG. 4B is an alternative water reservoir 60. Water reservoir 60 is constructed of a container 76, a cap 74, a needle 72, and quick disconnects 22 and 82. In use, cap 74 is removed from body 76 and a bag of sterile fluid 78 is placed inside container 76. Cap 74 is connected to body 76 to cause needle 72 to puncture bag 78. Pressurized air from compressor 12 enters container 76 and pressurizes container 76. Fluid is forced out of bag 78 through quick disconnect 82 to quick disconnect 22 to the chair water delivery system.

Figure 5:
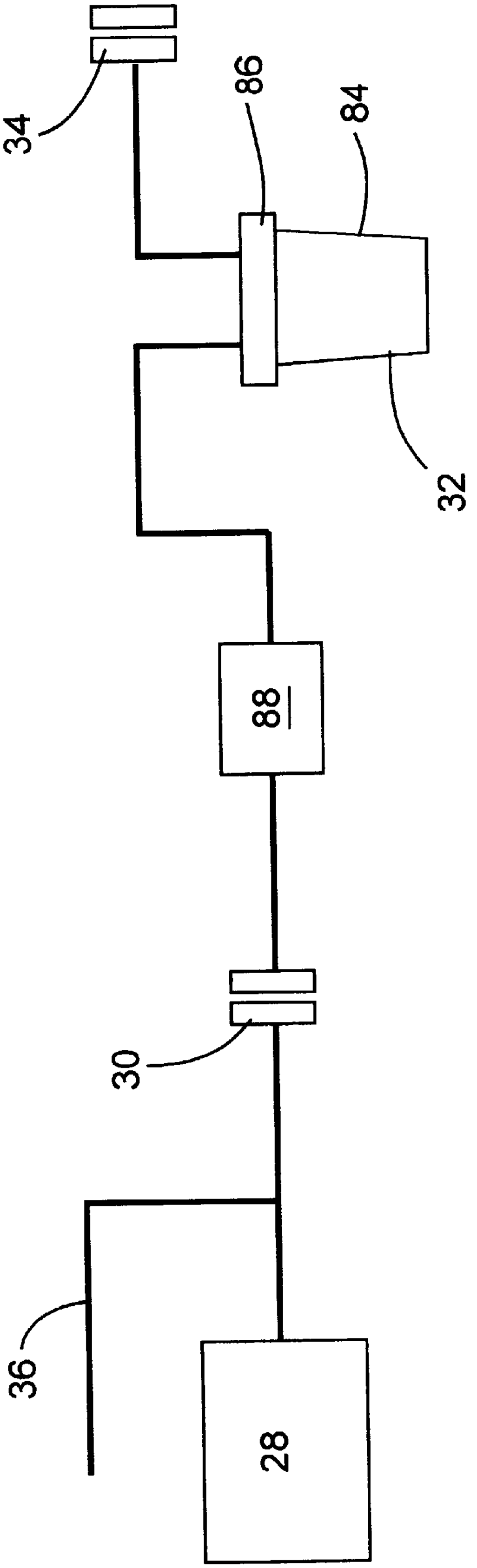
FIG. 5 is a schematic diagram of the vacuum system of the system of FIG. 1.

Referring to FIG. 5 the vacuum system will be described in more detail. Waste container 32, which is constructed of a body 84 and a top 86 collects the fluid and solid waste created during the dental procedure. Vacuum pump 28 creates a vacuum on waste container 32 through quick disconnect 30 and moisture trap 88. The outlet of waste container 32 is connected to the existing chair vacuum line through quick disconnect 34. The waste fluids and solids are drawn into waste container 32 and collected. Moisture in the line to vacuum pump 28 is collected by moisture trap 88. Waste container 32, moisture trap 88 and the lines from quick disconnect 30 to waste container 32 and from waste container 32 to quick disconnect 34 are all autoclavable. Body 84 is replaceable and removable from top 86 for sealing and disposal, eliminating the need for handling the waste products.

Figure 6:
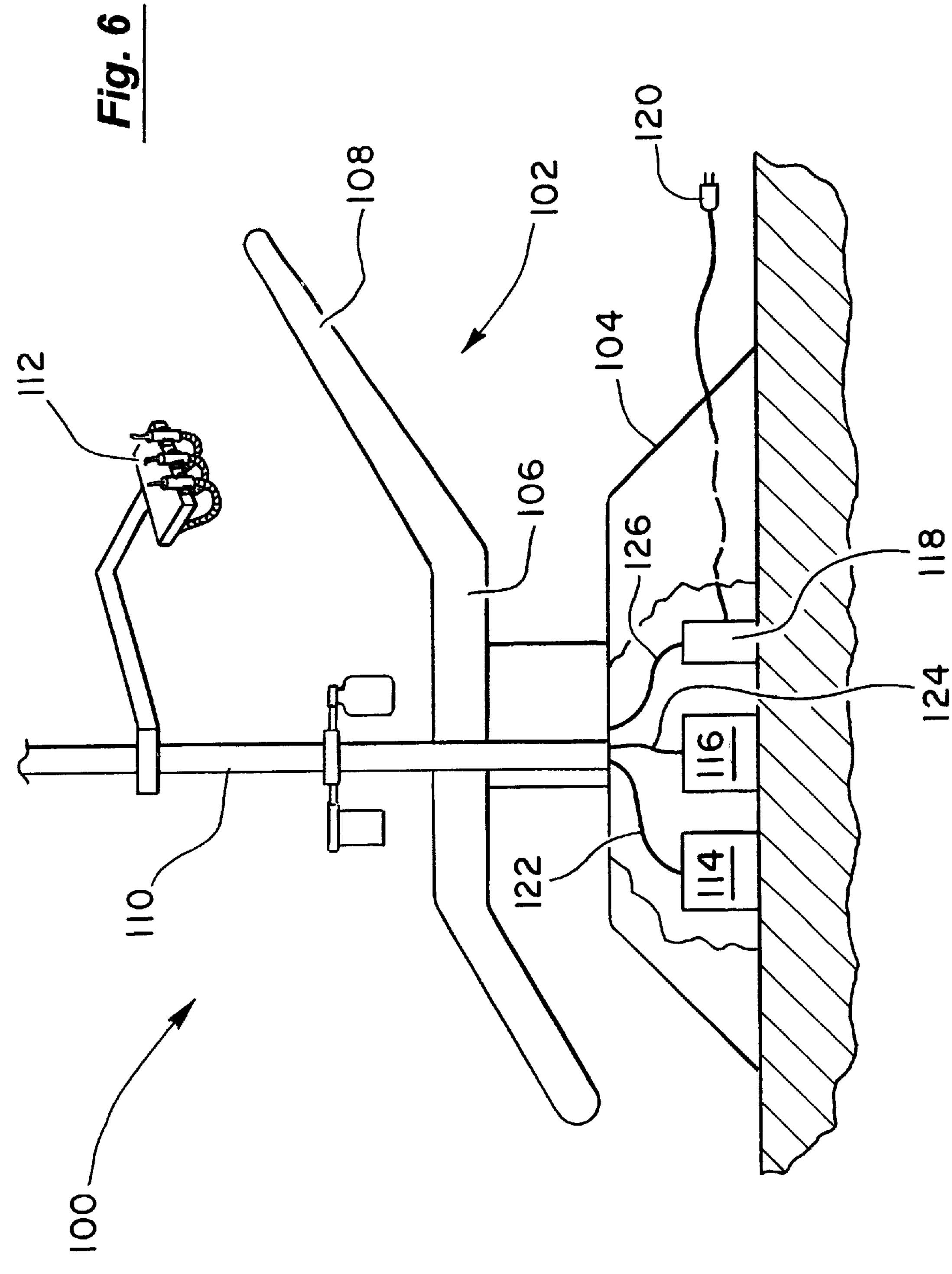
FIG. 6 is a schematic diagram of one embodiment of a dental chair system according to the invention.

FIG. 6 schematically illustrates one embodiment of a dental chair system 100. System 100 includes a chair 102 having a base 104, a seat 106 and a back 108. Chair 102 may be constructed to be similar in overall shape and appearance to conventional dental chairs. Extending vertically from base 104 is a delivery system support tube 110 to which is coupled a delivery unit 112. Delivery unit 112 may include a variety of dental devices as is known in the art. Merited by way of example, delivery unit 112 may include a handpiece, HVE, saliva ejector, air/water syringe, scaler, and the like.

Figure 7:
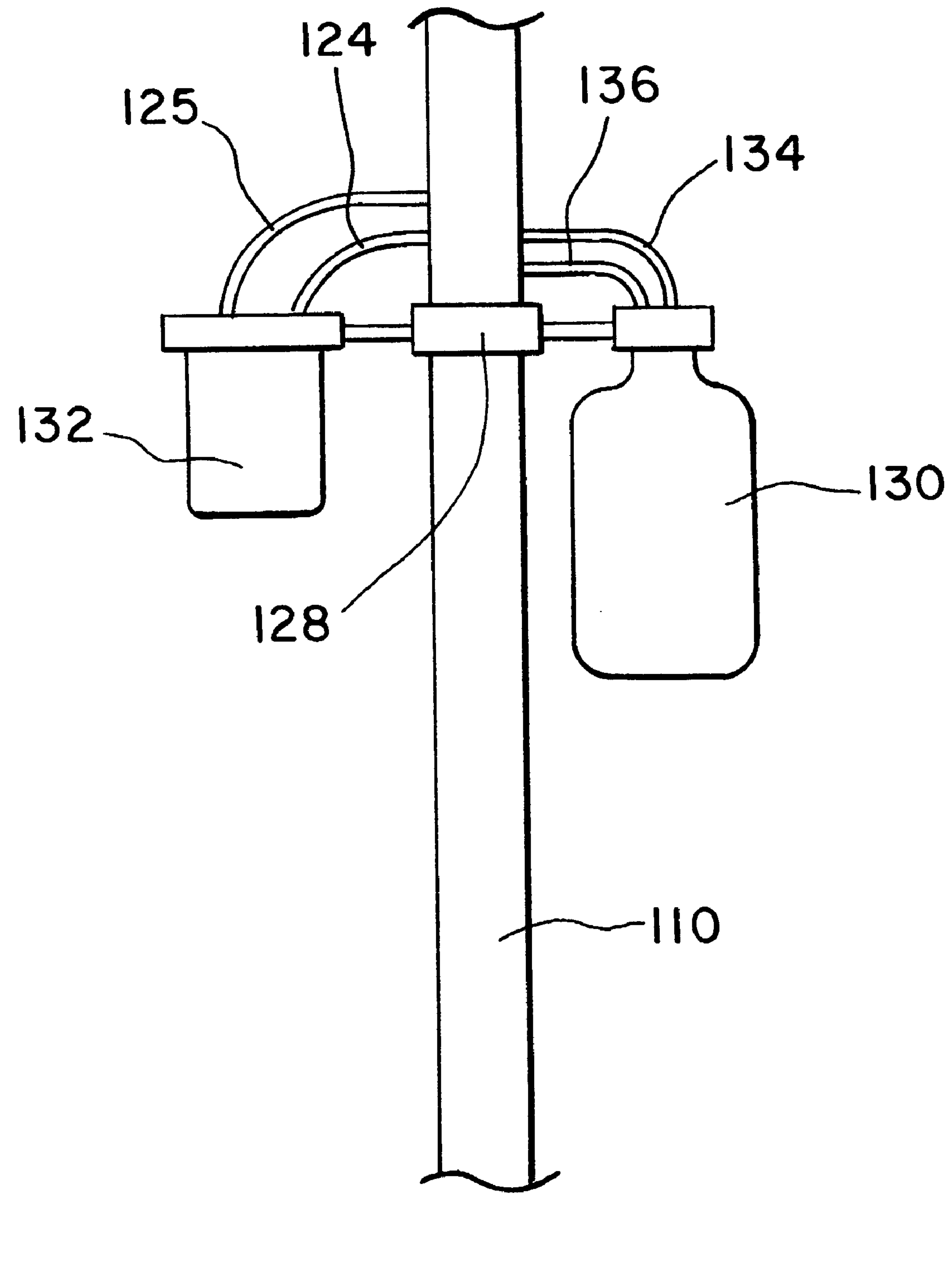
FIG. 7 illustrates in greater detail a waste container and a water reservoir of the dental chair system of FIG. 6.

Disposed within base 104 is a compressor 114, a vacuum pump 116 and a controller 118. Conveniently, power to the controller, vacuum pump and compressor may be provided by a conventional plug 120. Extending from compressor 114 is a positive pressure line 122, and extending from vacuum pump 116 is a vacuum line 124. A communication line 126 extends from controller 118 to permit controller 118 to control operation of compressor 114 and vacuum pump 116 in a manner similar to the previously described. As also shown in FIG. 7, a mounting bracket 128 is employed to mount a water reservoir 130 and a waste container 132 to tube 110. Positive pressure line 122 extends directly from compressor 114 to delivery unit 112 to supply positive pressure to the appropriate dental devices. Further, positive pressure line 122 is tapped to provide positive pressure to waster reservoir 130 through a line 134. The water exiting water reservoir 130 passes into a line 136 which supplies water to delivery unit 112.

Vacuum line 124 passes from vacuum pump 126 into waste container 132. An exit vacuum line 125 then continues to delivery unit 112 to provide a vacuum to the appropriate dental pieces. Waste collected from delivery unit 112 is captured in waste container 132. When needed, waste container 132 may simply be removed and replaced with a new container. In a similar manner, water reservoir 130 may be replaced when needed.

Figure 8:
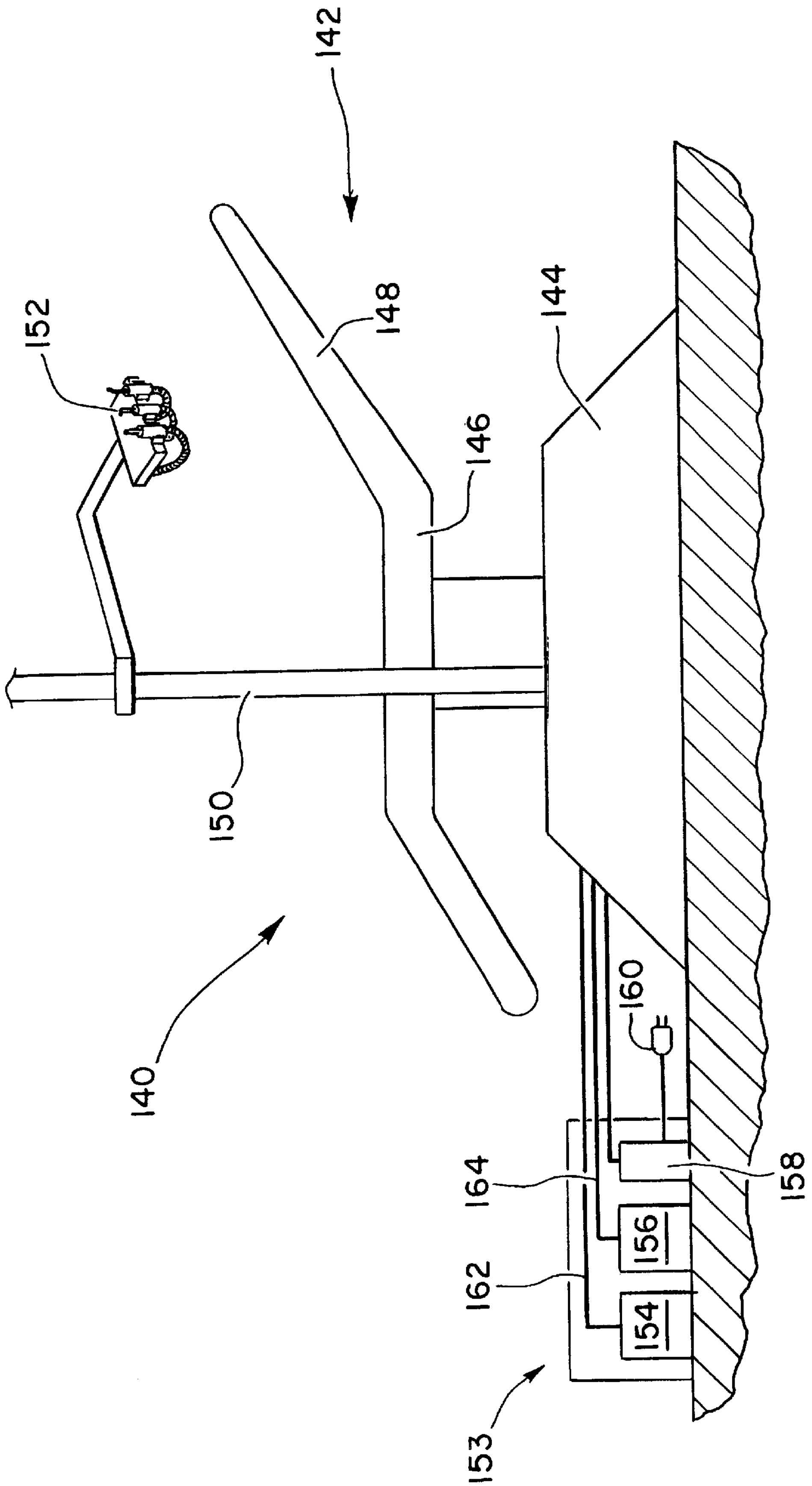
FIG. 8 is a schematic diagram of another embodiment of a dental chair system according to the invention.

FIG. 8 illustrates an alternative dental chair system 140. System 140 comprises a chair 142 having base 144, a seat 146 and a back 148. System 140 further includes a delivery system support tube 150 and a delivery unit 152 having appropriate dental devices in a manner similar to that previously described in connection with FIG. 6.

System 140 differs from system 100 of FIG. 6 in that system 140 includes an auxiliary unit 153 having a compressor 154, a vacuum pump 156 and a controller 158. In this way, the compressor, vacuum pump and controller may be incorporated into a separate unit that may be connected to an existing dental chair to provide a retrofit system. Power is supplied to auxiliary unit 153 through an electrical plug 160 in a manner similar to that described in connection with FIG. 6. Extending from compressor 154 is a positive pressure line 162, and extending from vacuum pump 156 is a vacuum line 164. Positive pressure line 162 and vacuum line 164 are configured to be connected to existing pressure and vacuum lines within dental chair 142 similar to that described in connection with FIG. 6.

Figure 9:
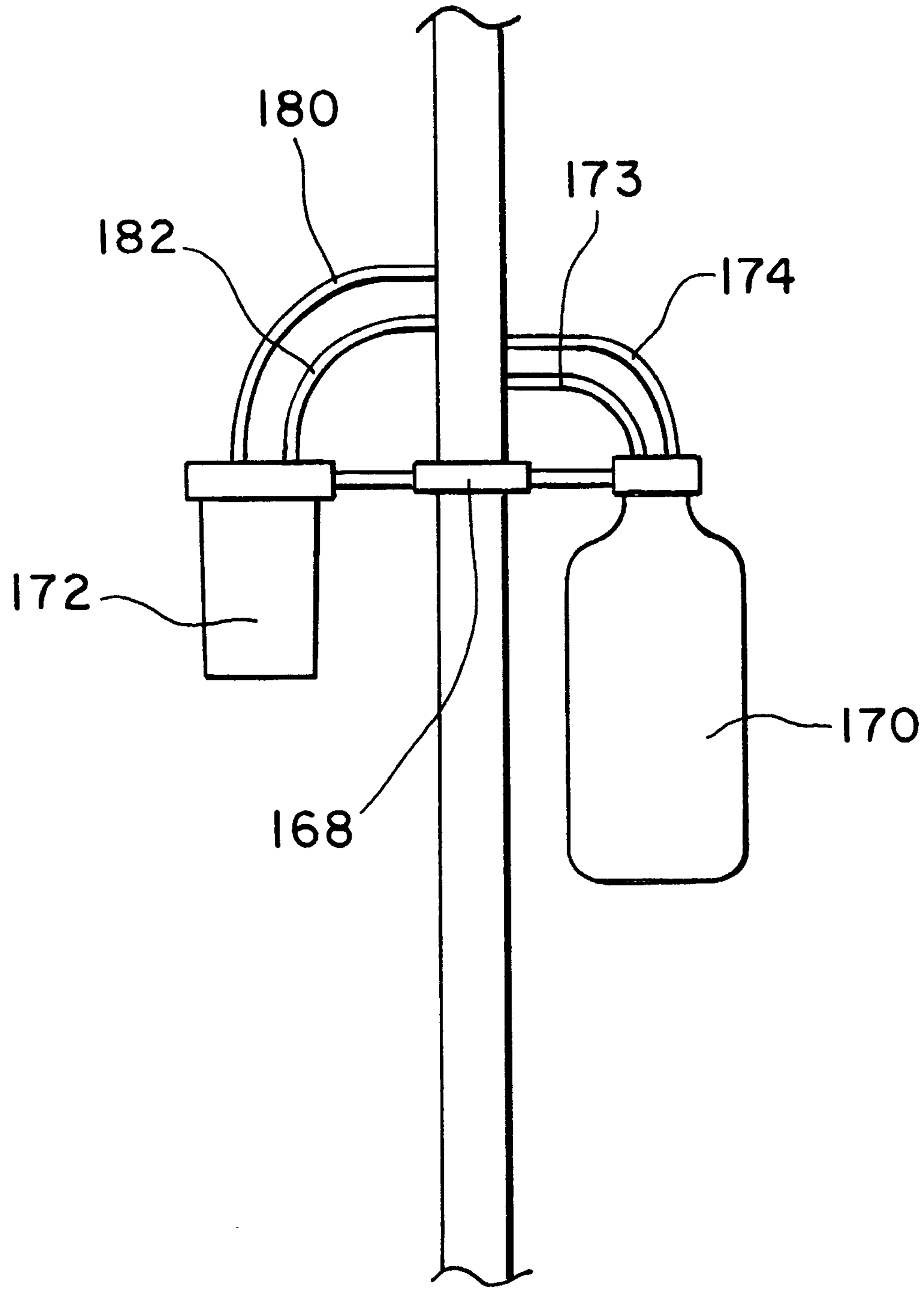
FIG. 9 is a more detailed view of a waste container and water reservoir of the dental chair system of FIG. 8.

As also shown in FIG. 9, system 140 includes a bracket 168 for holding a water reservoir 170 and a waste container 172. A positive pressure line 173 within dental chair 142 extends into water reservoir 170 to force the water into an existing chair water line 174. In this way, water may be supplied to the dental devices. Chair 142 further includes an airline 176 to permit positive pressure to be supplied to the dental devices from compressor 154. The vacuum supplied from vacuum pump 156 enters into waste container 172 through line 180 and exits through a line 182 which supplies vacuum to the dental devices.

Hence, the system of FIGS. 8 and 9 permits an existing dental chair to be retrofit with an auxiliary unit having components for producing positive pressure, vacuum and appropriate control signals. In this way, the dental chair does not need to be connected to such equipment typically located in the back room of a dental facility.

The invention has now been described in detail for purposes of clarity and understanding. However, it will be appreciated that certain changes and modifications may be practiced within the scope of the appended claims.

What is claimed is:

1. A dental chair, comprising:

a chair body having a base, a seat and a back;

a compressor fixedly mounted into the chair body;

a positive pressure line coupled to the compressor and being adapted to supply positive pressure to one or more dental tools;

a vacuum pump fixedly mounted into the chair body; and a vacuum line coupled to the vacuum pump and being adapted to supply a vacuum to one or more dental tools.

2. A dental chair as in claim 1, further comprising a controller incorporated into the chair body, the controller being electrically coupled to the compressor and the vacuum pump to control their operation.

3. A dental chair as in claim 2, further comprising a power supply incorporated into the chair body to supply power to the controller, the compressor and the vacuum pump.

4. A dental chair as in claim 1, further comprising a waste container coupled to the vacuum line to collect liquid waste from the vacuum line.

5. A dental chair as in claim 4, wherein the waste container comprises a lid that is coupled to the vacuum line and a base that is removably coupled to the lid to permit the base to be removed and discarded.

6. A dental chair as in claim 1, further comprising a water container coupled to the positive pressure line to permit water from the container to be supplied to one or more dental tools upon introduction of positive pressure into the water container.

7. A dental chair as in claim 6, wherein the water container comprises a housing, a sealed bag of water disposed within the housing, and a needle assembly coupled to the housing, the needle assembly having a hollow needle that is adapted to penetrate the sealed bag, wherein introduction of positive pressure into the housing causes the bag to compress and forces the water out of the needle.

8. A dental chair as in claim 1, wherein the compressor and the vacuum pump are disposed within the base of the chair body.

9. A dental chair as in claim 1, further comprising a pressure regulator to control the pressure in the positive pressure line.

10. A dental chair system, comprising:

a chair body having a base, a seat and a back;

a positive pressure line coupled to the chair body that is adapted to supply positive pressure to one or more dental tools;

a vacuum line coupled to the chair body that is adapted to supply a vacuum to one or more dental tools; and an auxiliary unit having a compressor, a vacuum pump and connections to permit the auxiliary unit to be coupled to the positive pressure line and the vacuum line.

11. A system as in claim 10, wherein the auxiliary unit further includes a power supply and a controller to control operation of the compressor and vacuum pump.

12. A dental chair as in claim 10, further comprising a waste container coupled to the vacuum line to collect liquid waste from the vacuum line.

13. A dental chair as in claim 12, wherein the waste container comprises a lid that is coupled to the vacuum line and a base that is removably coupled to the lid to permit the base to be removed and discarded.

14. A dental chair as in claim 10, further comprising a water container coupled to the positive pressure line to permit water from the container to be supplied to one or more dental tools upon introduction of positive pressure into the water container.

15. A dental chair as in claim 14, wherein the water container comprises a housing, a sealed bag of water disposed within the housing, and a needle assembly coupled to the housing, the needle assembly having a hollow needle that is adapted to penetrate the sealed bag, wherein introduction of positive pressure into the housing causes the bag to compress and forces the water out of the needle.

16. An auxiliary unit for a dental chair, the unit comprising:

a housing;

a compressor disposed within the housing;

a vacuum pump disposed within the housing;

a power supply;

a controller to control operation of the compressor and the vacuum pump;

a positive pressure connector to permit the compressor to be coupled to a positive pressure line of a dental chair; and a vacuum pressure connector to permit the vacuum pump to be coupled to a vacuum line of the dental chair.

* * * * *